United States Patent
Rosenberg

(10) Patent No.: US 10,904,483 B2
(45) Date of Patent: *Jan. 26, 2021

(54) SYSTEM AND METHODS FOR AUTOMATIC CALL INITIATION BASED ON BIOMETRIC DATA

(71) Applicant: Polycom, Inc., San Jose, CA (US)

(72) Inventor: Yaakov Moshe Rosenberg, Even Yehuda (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,594

(22) Filed: Oct. 18, 2018

(65) Prior Publication Data

US 2019/0174095 A1    Jun. 6, 2019

Related U.S. Application Data

(63) Continuation of application No. 13/231,122, filed on Sep. 13, 2011, now Pat. No. 10,122,970.

(51) Int. Cl.
  *H04N 7/15*    (2006.01)
  *H04N 7/14*    (2006.01)
  *H04N 21/258*    (2011.01)
  *H04N 21/4415*    (2011.01)

(52) U.S. Cl.
  CPC .............. *H04N 7/15* (2013.01); *H04N 7/142* (2013.01); *H04N 21/25875* (2013.01); *H04N 21/4415* (2013.01)

(58) Field of Classification Search
  USPC .................................................. 348/14.09
  See application file for complete search history.

(56) References Cited

U.S. PATENT DOCUMENTS

| | | | |
|---|---|---|---|
| 5,530,472 A | 6/1996 | Bregman et al. | |
| 5,850,470 A | 12/1998 | Kung et al. | |
| 6,335,927 B1 * | 1/2002 | Elliott | H04L 12/14 370/352 |

(Continued)

OTHER PUBLICATIONS

Office Action dated Aug. 19, 2009 regarding U.S. Appl. No. 11/461,204.

(Continued)

*Primary Examiner* — Amal S Zenati
(74) *Attorney, Agent, or Firm* — Keith Lutsch, PC

(57) ABSTRACT

A videoconferencing endpoint can provides a caller with the ability to make unscheduled video calls to a callee without having knowledge of dialing information of a videoconferencing endpoint where the callee is currently located. The videoconferencing endpoint searches a location database using an identity of the callee provided by the caller, where the location database can store dialing information of a videoconferencing endpoint where the callee is known to be located. The videoconferencing endpoint can collect biometric data from a user and determine the identity of the user by matching the collected biometric data to biometric data stored in a biometric database. If a match is found, the videoconferencing endpoint updates the location database such that the location database indicates the videoconferencing endpoint as the current location of the user.

19 Claims, 9 Drawing Sheets

(56) References Cited

U.S. PATENT DOCUMENTS

| | | | |
|---|---|---|---|
| 6,618,806 B1 * | 9/2003 | Brown | G06F 21/32 |
| | | | 709/225 |
| 6,687,234 B1 * | 2/2004 | Shaffer | H04L 12/185 |
| | | | 370/260 |
| 6,792,144 B1 | 9/2004 | Yan et al. | |
| 6,850,265 B1 | 2/2005 | Strubbe et al. | |
| 6,894,714 B2 | 5/2005 | Gutta et al. | |
| 6,940,545 B1 | 9/2005 | Ray et al. | |
| 7,174,365 B1 | 2/2007 | Even et al. | |
| 2002/0064314 A1 | 5/2002 | Comaniciu et al. | |
| 2003/0090564 A1 | 5/2003 | Strubbe | |
| 2006/0259755 A1 * | 11/2006 | Kenoyer | G06F 21/32 |
| | | | 713/1 |
| 2009/0061872 A1 | 3/2009 | Hicks | |

OTHER PUBLICATIONS

Office Action dated Feb. 23, 2010 in U.S. Appl. No. 11/461,204.
Office Action dated Jun. 25, 2010 in U.S. Appl. No. 11/641,204.
Office Action dated Oct. 28, 2010 in U.S. Appl. No. 11/461,204.
Office Action dated Apr. 29, 2011 in U.S. Appl. No. 11/461,204.

* cited by examiner

FIG. 3A

| Biometric data — 311 | User Identity — 312 |
|---|---|
| Front face, voice | User A — 313 |
| 3D face, front, sides | User B — 314 |
| ... | ... |
| front, sides | User Z — 315 |

| Location — 321 | Dialing Information — 322 |
|---|---|
| EP 1 | 112.34.10.1:2332 — 323 |
| EP 2 | 112.34.10.2:4553 — 324 |
| ... | ... |
| EP 10 | 112.34.10.10:1199 — 325 |

| User Identity — 331 | Current Location — 332 | Last-Known Location — 333 |
|---|---|---|
| User A | EP 2 | EP 6 — 334 |
| User B | EP 5 | EP 8 — 335 |
| ... | ... | ... |
| User Z | unknown | EP 10 — 336 |

↗ 303

| User Identity | Dialing Information |
|---|---|
| User A | 112.34.10.2:4553 |
| User B | 112.34.10.5:5423 |
| ⋮ | ⋮ |
| User Z | 112.34.10.10:1199 |

| User Identity | Current Location | Last-Known Location | Mobile phone number | E-mail |
|---|---|---|---|---|
| User A | EP 1 | EP 6 | (123) 456 7891 | userA@xyz.com |
| User B | EP 5 | EP 8 | (123) 456 7892 | userB@xyz.com |
| ... | ... | ... | ... | ... |
| User Z | unknown | EP 10 | (123) 456 7900 | userZ@xyz.com |

*FIG. 7*

SYSTEM AND METHODS FOR AUTOMATIC CALL INITIATION BASED ON BIOMETRIC DATA

CROSS-REFERENCE TO RELATED APPLICATIONS

This application is a continuation of U.S. application Ser. No. 13/231,122, filed Sep. 13, 2011, which is incorporated by reference herein in its entirety.

The present application is related to U.S. application Ser. No. 12/779,382 entitled "Method and System for Launching a Scheduled Conference Based on the Presence of a Scheduled Participant," filed May 13, 2010, which is incorporated by reference herein in its entirety. The present application is also related to U.S. application Ser. No. 11/461,204 entitled "System and Method for using Biometrics Technology in Conferencing," filed Jul. 31, 2006, now U.S. Pat. No. 8,218,829, which is incorporated by reference herein in its entirety.

FIELD OF THE INVENTION

The present invention relates generally to conferencing systems, and more particularly to initiating unscheduled video calls in a conferencing system based on biometrics.

BACKGROUND

Videoconferencing involves communication between two or more videoconferencing terminals. Each videoconferencing terminal is typically placed within a conference room or in an office. One or more conference participants will gather in one or more of the conference rooms that includes a videoconferencing terminal. Subsequently, one of the conference participants at a near end conference room will initiate a videoconferencing call by dialing a number, e.g., an IP address, associated with one or more videoconferencing terminals of the far end conference room. Upon receiving the videoconferencing request, the far end participants will answer the call thereby approving the establishment of a videoconferencing session. Finally, near end videoconferencing terminal and the far end videoconferencing terminals will establish a videoconference call allowing conference participants to communicate with each other.

But establishing a videoconferencing session in the above manner can be cumbersome. For example, all participants need to be present in predetermined conference rooms for the videoconference call to be successful. If a conference participant at either the near end or far end conference room forgets the scheduled videoconference session, then the videoconference session will not be established. Additionally, the participant that establishes the videoconferencing session needs to enter the dialing number or the IP address of the far end videoconferencing terminal. The dialing numbers and the IP addresses are generally long and difficult to remember. Not surprisingly, impromptu videoconferencing sessions are difficult to set up, especially because the far end participants are unaware of an incoming call and the near end participants are unaware of the location of the far end participants.

A solution is presented that mitigates the inconvenience due to the need for participants to be present at predefined locations for participating in a videoconference and the inconvenience due to remembering and dialing long dialing numbers and IP addresses for establishing a videoconference call.

SUMMARY

A videoconferencing unit provides a caller to initiate an unscheduled videoconferencing session with a callee merely by identifying the callee. The caller does not need to have knowledge of the dialing information or the location of the videoconferencing endpoint where the callee is located. The caller can start a conversation with the callee as if it were a face to face conversation.

The videoconference unit can receive a request for a videoconferencing call from a caller, which request can include the name or identity of the callee. The videoconferencing endpoint can determine the current location of the callee by accessing a location database, which can include identities of various users and the dialing information of a videoconferencing endpoint that a user was last known to be located. The acquiring of dialing information of the videoconferencing endpoint is made independent of the caller. In other words, the caller does not provide the dialing information to the videoconferencing unit.

Each videoconferencing endpoint can include a biometric module for generating biometric templates from user biometrics such as images and/or voices of users. The templates can be stored in a biometric database. Whenever the videoconferencing endpoint collects biometrics of a user, it can access the biometric database to determine the identity of the user whose biometrics have been collected. Upon determining the identity of the user, the videoconferencing endpoint can update the location database such that the current location of the identified user is now the videoconferencing endpoint. Additionally, the videoconferencing endpoint can update the biometric database with the most recently collected biometric templates for the identified user.

The location and biometric database can be stored at a database server. In another example the location and biometric databases can be distributed over multiple videoconferencing endpoints.

In another example, the videoconferencing endpoint can broadcast an identity of a callee to all other videoconferencing endpoints. Each of the other videoconferencing endpoints can collect biometric data of users located in its vicinity and compare the collected biometric data with biometric data stored in the biometric database to find a match. If a match is found, the videoconferencing endpoint where the callee is located can send reply to the videoconferencing endpoint where the caller is located with a message indicating the location of the callee. The message can also include dialing information of the videoconferencing endpoint where the callee is located. In this case, there is no need for a stored location database as the location of the callee is determined by communicating with all other videoconferencing endpoints.

The location database can also include alternate contact information of the users. If the callee is not present at a called endpoint, then the calling endpoint can access the location database to acquire alternate contact information of the callee. The calling endpoint can then send a message to the callee using the alternate contact information informing the callee of an awaiting video call. The message may also include an identity of the caller. The calling endpoint can also periodically access the location database to check if the location of the callee has been updated to another endpoint. If the callee has relocated to anther endpoint, the video call with the called endpoint can be terminated and a video call with the endpoint where the callee has relocated can be established.

In yet another example, the videoconference endpoint can communicate with a multipoint control unit (MCU) over a network. The MCU can perform operations such as initiating video calls, determining locations of callees, generating biometrics, updating the biometric and location database, etc. on behalf of the videoconferencing endpoint. For example, the biometric module and the biometric and location database can be located in the MCU instead of, or in addition to, being located at the videoconferencing endpoint. Upon receiving a call request from a caller, the videoconferencing endpoint can send the request to the MCU for the MCU to determine the current location of the callee by accessing the location database. The MCU can establish a call with the calling videoconferencing endpoint and the videoconferencing endpoint where the callee is currently located. The MCU can also receive call requests for multiple callees to establish a multipoint unscheduled videoconference session.

BRIEF DESCRIPTION OF THE DRAWINGS

Exemplary embodiments of the present invention will be more readily understood from reading the following description and by reference to the accompanying drawings, in which:

FIGS. 3A-3D show exemplary data structures for storing biometric and location data associated with users;

FIG. 3E shows an example of a server having a database that can store all or a portion of the biometric and location data of FIGS. 3A-3D;

FIG. 7 shows and exemplary data structure that includes alternate contact information associated with the users.

DETAILED DESCRIPTION

Figure 1:
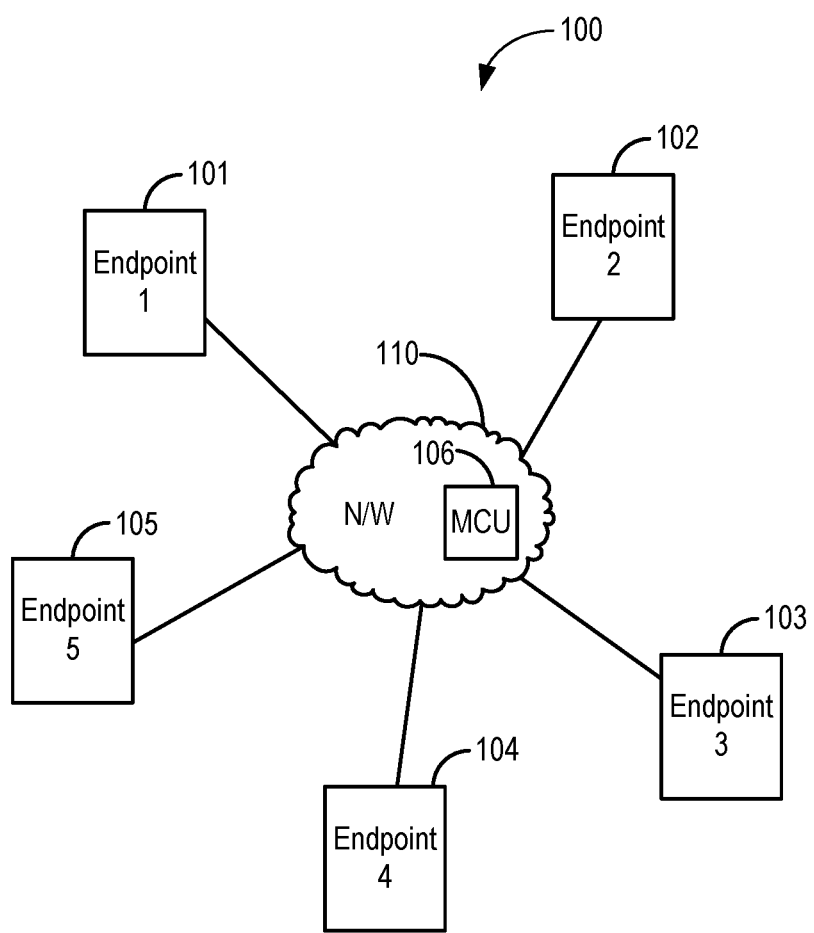
FIG. 1 shows an exemplary system of endpoints configured to communicate over a network.

FIG. 1 shows a system 100 including a number of endpoints, namely Endpoint 1 (EP 1) 101-Endpoint 5 (EP 5) 105, which can communicate with each other over network 110. Endpoints EP1-EP5 101-105 may be situated at various geographical locations. In one example, endpoints EP 1-EP 5 101-105 can be situated at various locations within a company or organization. For example, the endpoints can be situated in conference rooms, offices, desktops of users/employees, etc. The company or organization may be housed in a single building or may be spread across multiple buildings in one or more cities, states, or countries. The endpoints can also be mobile. Network 110 can be a circuit switched network, a packet switched network, or a combination of the two. Network 110 can have a physical layer that is wired, wireless, or a combination of the two. Examples of network 110 are IP network, Ethernet, ATM, SONET, Fibre Channel, etc. A multipoint control unit (MCU) 106 can provide videoconferencing between more than two participants.

Figure 2A:
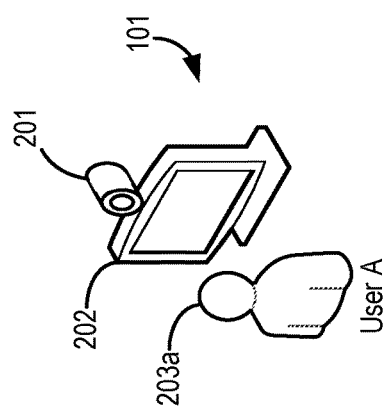
FIG. 2A depicts an exemplary endpoint that can be used by a user to carry out unscheduled videoconferencing calls.

FIG. 2A shows an exemplary endpoint 1 101, which can include a camera 201 and a display 202. User A 203a can use endpoint 1 101 to establish and carry out videoconferencing with one or more far end participants. Endpoint 1 101 can be a personal desktop videoconferencing system (e.g., POLYCOM® HDX® 4000 Series), a conference room videoconferencing system (e.g., POLYCOM® HDX® 9000 Series), an immersive telepresence videoconferencing system (e.g., POLYCOM® RealPresence™ Experience (RPX) Series), a personal digital assistant or mobile-phone (e.g., APPLE® IPHONE4®, IPAD®), a desktop, laptop, or handheld computer running a videoconferencing application (e.g., POLYCOM® CMA™ Desktop), etc.

Figure 2B:
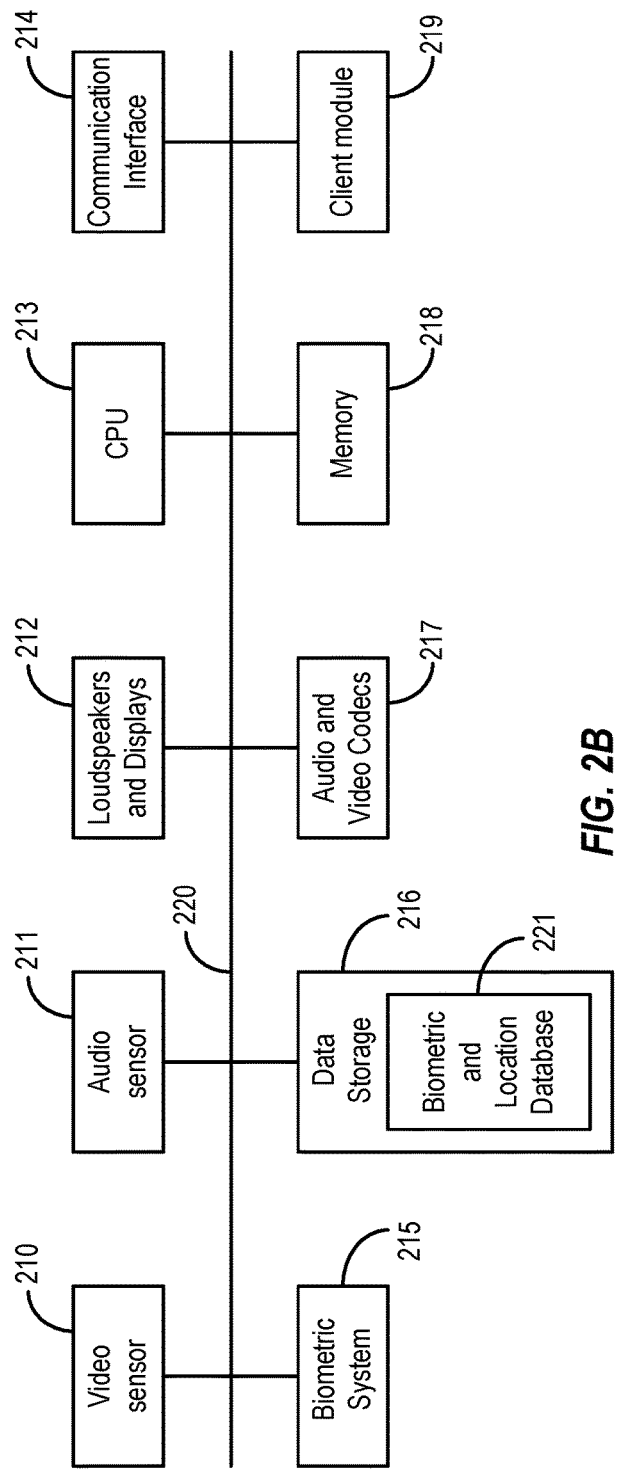
FIGS. 2B and 2C show exemplary block diagrams of the endpoint and the biometric system of the endpoint.

FIG. 2B shows and exemplary block diagram of the endpoint 1 101. Endpoint 1 101 can include a video sensor 210, which can include a camera 201, or any other image capturing device. Camera 201 can capture images in two-dimensions (2D) as well as three-dimensions (3D). An audio sensor 211 can include one or more microphones for capturing the voice and sound of one or more users (e.g., User A 203). Loudspeakers and displays 212 can reproduce audio and video signals representing voice and image of one or more far end participants. CPU 213 can include one or more microprocessors. Communication interface 214 can include a network interface, wireless interface, Ethernet interface, etc. for sending and receiving communication signals to and from the network 110. Memory 218 can be volatile memory such as RAM, DRAM, SRAM, etc. Audio and video codecs 217 can include audio and video compression hardware, software or a combination of hardware and software. Audio codecs can include, but are not limited to, G.711, G.729, G.723, G.726, G.728, etc. Video codecs can include, but are not limited to, H.263, H.264, etc. Data storage 216 can include non-volatile memories such as FLASH memory, hard disk drive, etc. As will be discussed further below, the data storage 216 can include biometric and location database 221. The endpoint can access this database 221 to access user biometric data to determine the current location of a requested user. Memory 218 and data storage 216 can also store software applications, program instructions, and data to be executed on the endpoint 101 and in particular on CPU 213. Client module 219 can provide the endpoint access to a server located on the network 110. The endpoint 101 can use the client module 219 to query a biometric and location server for biometric and location information. Biometric system 215 can generate and match biometric data of users of endpoint 101, as discussed in further detail below. The biometric system 215 and other components of the endpoint 101 can communicate over a common interface 220, which can be a shared memory, an addressable bus, etc.

Figure 2C:
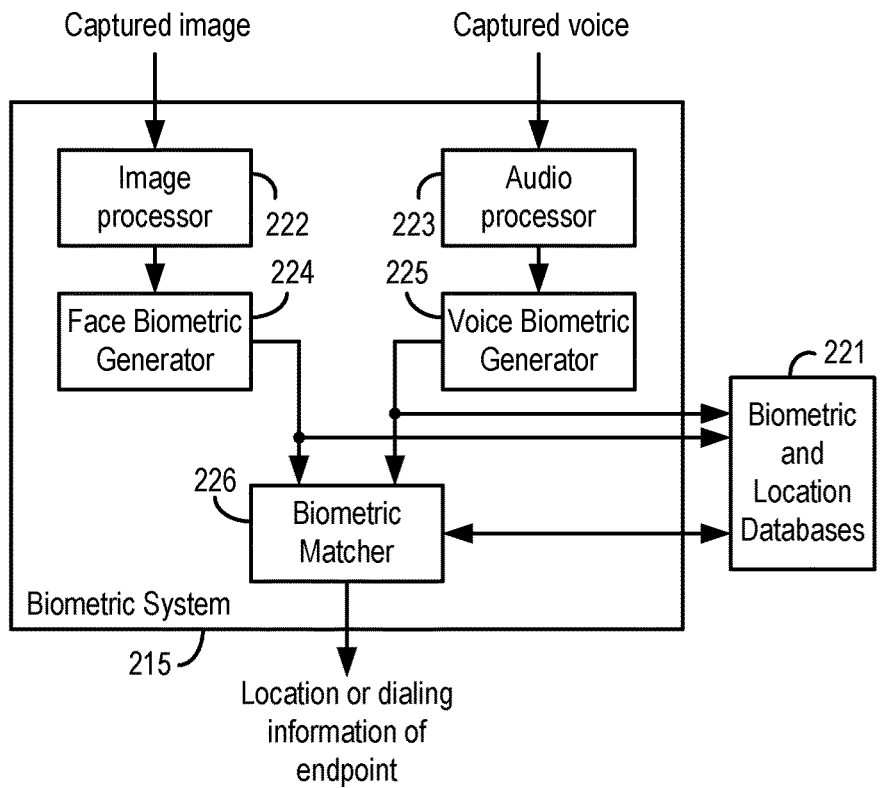

FIG. 2C illustrates an exemplary block diagram of the biometric system 215 of endpoint 101. The biometric system 215 can process biometric data based on one or more than one physiological or behavioral characteristic of the users. For example, the biometric system 215 can collect data related to face, voice, iris, etc. of users. In the example shown in FIG. 2C, the biometric system includes a face biometric generator 224 and a voice biometric generator 225. These two biometric generators can generate biometric templates associated with face image and voice sound of a particular user. The face images and voice sound can be provided by the image processor 222 and audio processor 223. Image processor 222 and audio processor 223 can process image and voice data received from the video sensor 210 and the audio sensor 211. For example, image processing can include face detection and extraction, filtering, converting from color to grayscale, adjusting contrast, scaling, etc. Similarly, audio processing can include, for example, filtering, scaling, re-sampling, etc. Audio processor 223 and 225 can also be used for voice to text conversion. This can be used when a user wants to initiate a videoconference call by calling out the name of the other user it would like to connect to.

Biometric templates generated by the face and voice biometric generators 224 and 225 can be stored in the biometric and location database 221. This can be typically done during enrollment—when a user's biometric is collected for the first time, or can be also done during updating of biometric data. For example, endpoint 101 may generate biometrics of users each time the user logs on to the endpoint, and subsequently update the generated biometric for the user on the database 221. Biometric templates can also be received by a biometric matcher 226, which compares biometric templates produced by the biometric generators with biometric templates stored in the database 221. Biometric matcher 226 can use only face biometrics for matching, only use voice biometrics for matching, or use both face and voice biometrics for matching. Which of the one or more biometric is used for matching by the biometric matcher 226 can be based on various factors such as availability of the biometric, magnitude of confidence in matching, etc.

Biometrics system 215 may use several techniques such as Kernel Class-Dependent Feature Analysis, Tensorfaces, manifold learning methods, kernel methods, Linear Discriminant Analysis, Eigenfaces, Bayesian Intapersonal/Extrapersonal Classifier, Gabor Filter Graph Matching Algorithm, 3D face recognition algorithms, etc. for generating and matching face templates. Furthermore, techniques such as frequency estimation, hidden Markov models, Gaussian mixture models, matrix representation, etc. can be used for generating and matching voice templates.

Figure 2D:
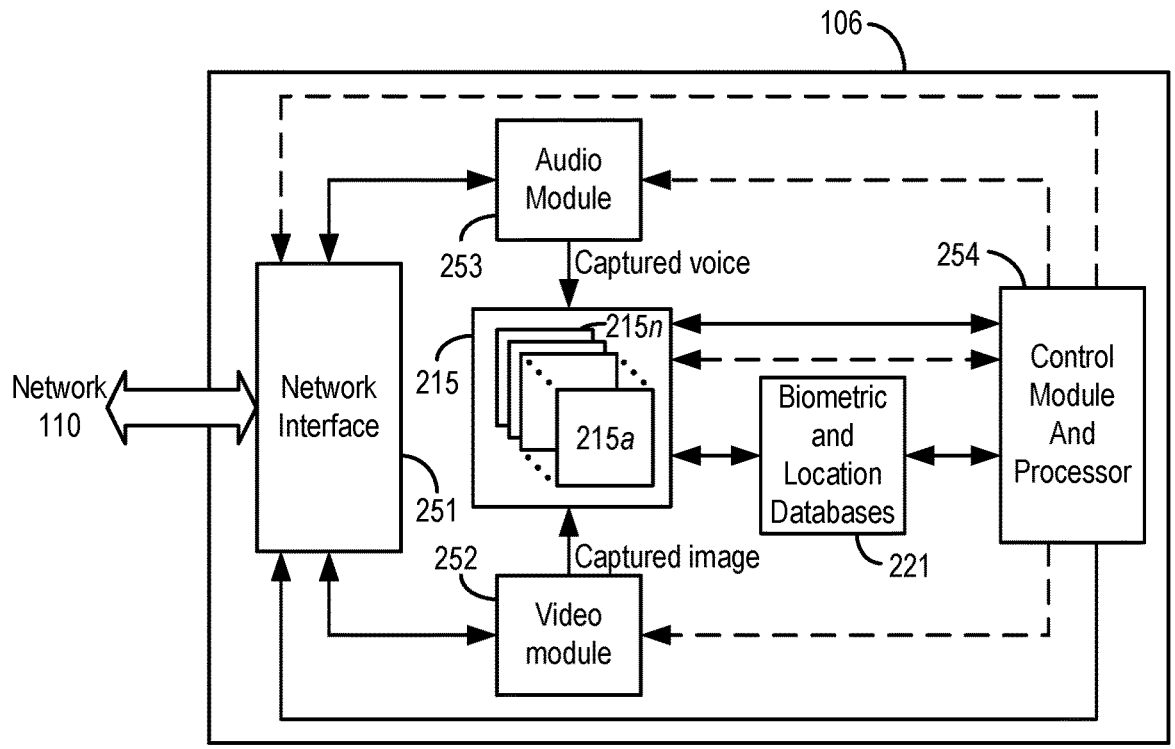
FIG. 2D shows an exemplary block diagram of a multipoint control unit including a biometric system.

While FIG. 2C shows the biometric system 215 located at the endpoint 101, in one example, the biometric system 215 can be located at the MCU 106, as shown in FIG. 2D. In such an arrangement, biometric data generation and matching can be carried out by the MCU 106 on behalf of one or more endpoints communicating with the MCU 106 over network 110. The biometric system 215 can be coupled to video and audio modules 252 and 253. The video and audio modules 252 and 253 can communicate audio and video data with endpoints 101-105. The video and audio modules 252 and 253 can include encoders and decoders for encoding and decoding audio and video data, mixers for mixing audio and video data, and other audio and video processing and conditioning units. Biometric system 215 at the MCU 106 can receive, for example, face image and voice sounds from endpoint 101 via the video and audio modules and generate corresponding biometric templates. Subsequently, the biometric system 215 can perform matching and accessing the biometric and location database 221. While database 221 is shown to be located within the MCU 106 the database 221 can be located anywhere in the network 110, and can be accessed by the MCU 106 via the network interface 251. The control module 254 can send the endpoint 101 any generated biometric templates, results of biometric matches, data received from the biometric and location database 221, etc. via network interface 251. Thus, the endpoint 101 may be relieved of the cost and processing burden of carrying out biometric processing locally at the endpoint 101. In yet another example, the MCU 106 can include multiple biometric systems 215a-215n, each biometric system 215a-215n associated with a separate conference. The multiple biometric systems may also be arranged such that one biometric system is assigned to each active videoconference. Also, the biometric system 215 may have some of its portions located in the endpoints, while the others located in the MCU 106.

The control module 254 can control the operation of the MCU 106, like in a standard MCU. In addition, the control module 254 controls the operation of the biometric system 215 and communicates with the endpoints 101-105 for establishment of a conference call based on biometric data. The control module 254 can carry out enrollment and biometric data collection, similar to the CPU 213 of endpoint 101 (FIG. 2B). The control module 254, video and audio modules 252 and 253, the biometric system 215 and the network interface 251 can be implemented in software, hardware, firmware, or a combination of software/hardware/firmware. Some exemplary hardware can include microcontrollers, microprocessors, multi-core processors, field programmable gate arrays (FPGAs), application specific integrated circuits (ASICs), etc.

Figures 3D, 3E:
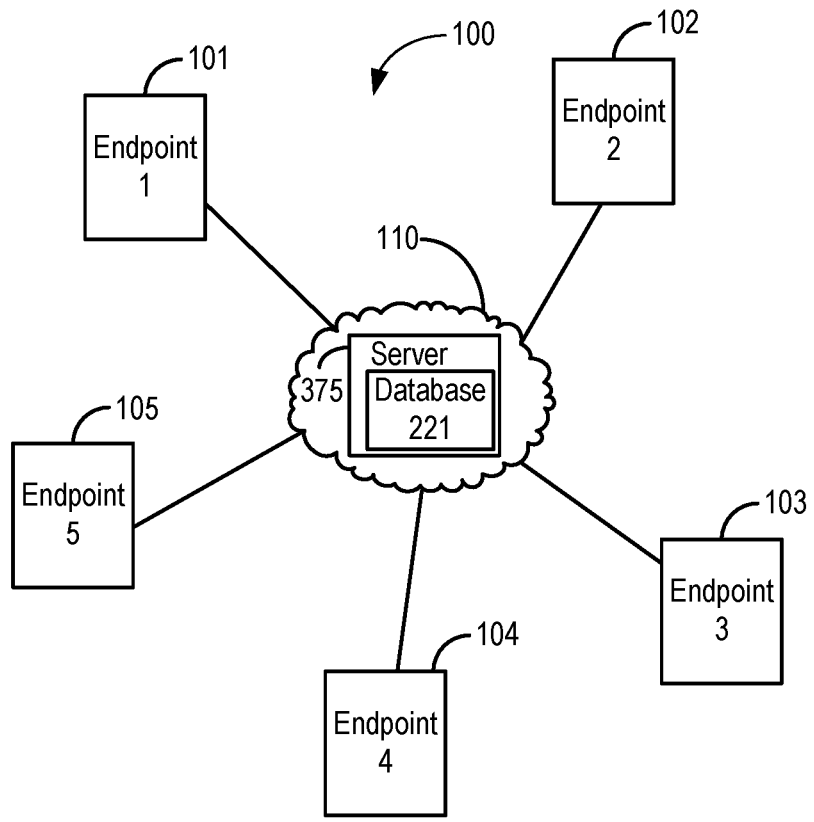

Discussion now turns to the data stored in the database 221. FIGS. 3A-3D illustrate exemplary tables that show a format in which data pertaining to user biometrics and user locations can be stored in database 221. FIG. 3A shows a biometrics table 301 that stores biometric data associated with each user. Column labeled biometric data 311 store biometric templates such as face templates, voice templates, etc., while the column labeled 312 can store user names. For example, row 313 includes the name of "User A" and the corresponding biometric data such as biometric templates for an image of the front face and voice signal. Similarly, rows 314 and 315 store names and corresponding biometric data of User B and User Z. Table 301 can be populated during enrollment and updated with new biometric templates or new biometric data.

FIG. 3B shows an exemplary dialing information table 302 that stores dialing information corresponding to one or more endpoints. For example, the column labeled Location 321 stores a list of endpoints EP 1, EP 2, . . . , EP 10. Column 322 labeled Dialing Information can store IP addresses associated with the videoconferencing units at each endpoint. Row 323 shows IP address 112.34.10.1:2332 and IP port number associated with endpoint EP 1. Similarly, rows 324 and 325 show store the endpoint names and corresponding IP addresses and port numbers for endpoints EP 2 and EP 10, respectively.

FIG. 3C shows a user location table 303 that indicates a current known location and a last known location of a user. Column labeled User Identity 331 lists the names of various users. Column labeled Current Known Location 332 indicates the current known location of a particular user in column 331. Column labeled Last-Known Location 333 indicates the last location that a user was known to be located. Row 334 shows the current location of User A as being EP 2 and EP 6, respectively. Similarly, rows 335 and 336 show the current and last known locations of User B and User Z, respectively. The user location table 303 can be constantly updated based upon new data indicating that a location of a user has changed.

FIG. 3D shows a user dialing information table 304 that combines information from tables 302 and 303. Column labeled User Identity 341 lists the identities of one or more users, while column labeled Dialing Information 342 can include dialing information of the endpoints where the user is currently believed to be located. The endpoint 101 can access information in this table to directly acquire dialing information of the endpoint where the requested user is located. For example, if a user at the endpoint 101 wishes to begin a videoconference call with User B, then the endpoint 101 can look up User B in table 304 and determine that it needs to dial 112.34.10.5:5423 (which is the dialing information corresponding to endpoint EP 5 105).

Information in tables 301-304 can be stored in each endpoint within the system 100 (FIG. 1) in the form of a distributed database. Any changes to the data at any one endpoint can be duplicated or replicated at all other endpoints.

One or more of the tables 301-304 shown in FIGS. 3A-3D can be located at one or more servers 375 (FIG. 3E) on the network 110 instead of within the data storage 216 on the endpoint 101. One or more endpoints within the system 100 can access the server 375 for biometric and location information. In one example, all of the biometric and location information included in tables 301-304 can be stored at database 221 in the server 375. In such cases, an endpoint 101 can use the client module 219 to send biometric data collected by the endpoint 101 to the server 375, to send queries on current location of users, and to receive location information in response to these queries. In another example, the endpoint 101 may only store table 304 in its data storage 216, and may query the server 375 for current location of a user not found in table 304. The server 375 can send updated location information to the endpoint periodically or whenever there is a change in the location information of any user.

Figure 4C:
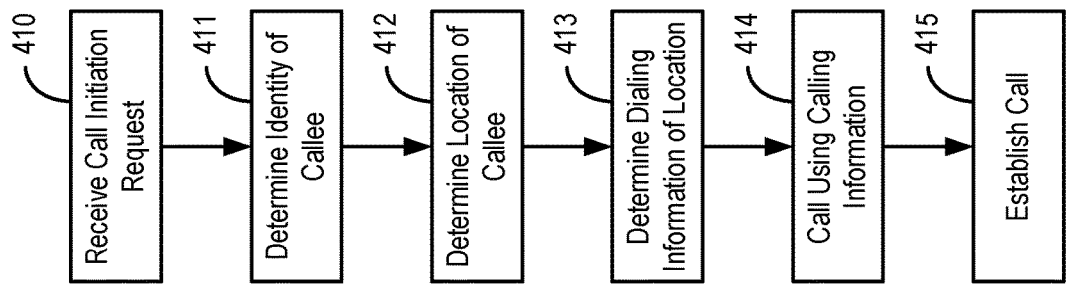
FIG. 4C shows a flowchart for initiating an unscheduled videoconference call by a user.

Discussion now turns to the operational aspects of the endpoint 101. FIG. 4A shows an exemplary flowchart for enrollment of a new user. In step 402 the endpoint 101 can create a new entry for the user. For example, the endpoint 101 can create a new entry in table 301 for the new user. In step 403, the endpoint 101 can collect biometric data associated with the new user. For example, the endpoint can take an image of the new user using camera 201, and generate biometric data using the biometric system 215. Endpoint 101 can request the new user to provide more than one image, perhaps from different angles with respect to the face, and generate more than one biometric template associated with the new user. Generating biometrics templates for images of the face captured from different angles can provide the endpoint with a comprehensive set of biometric data on the user. This can be advantageous when an endpoint wants to determine the identity of a face it has captured, where the face appears at an angle, or only the side view of the face has been captured. The endpoint 101 can additionally capture the voice of the new user and generate voice biometrics. Biometrics in addition to face and voice can also be collected by the endpoint 101. The endpoint 101 can also, if necessary, modify conditions surrounding the user to improve the quality of biometric data captured. For example, the endpoint may include a light source, which is turned on during insufficient ambient light. Endpoint 101 can also zoom into the face of the user to increase the resolution of a captured face image. For voice, endpoint 101 can employ techniques such as gain control, filtering, etc. to improve the strength and quality of the captured voice signal.

All generated biometric templates associated with a user can be stored in the biometric and location database (step 404). For example, biometric templates, or pointers to memory locations where the biometric templates are stored, can be stored in table 301. Additionally, endpoint can also update other tables 302-304 if possible. For example, if the endpoint at which the user enrollment is carried out is part of the videoconferencing system 100 of FIG. 1, then that endpoint would be the current location of the user. Therefore, the endpoint 101 can update table 303 and table 304 with the relevant information. Alternatively, in cases where a portion of or the complete biometric and location database 221 is located at the server 375 the endpoint 101 may only send information such as biometric templates, identity of the user, identity of the endpoint where the biometric was collected, etc.

Figure 4B:
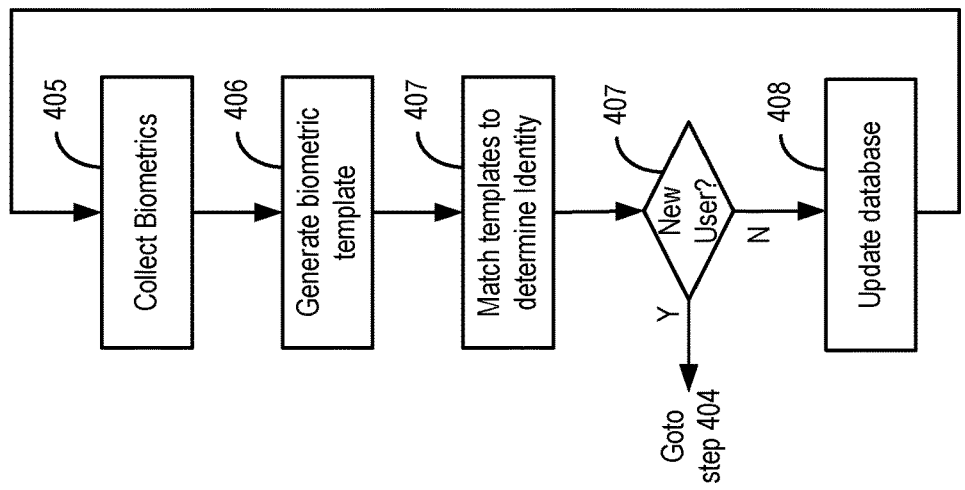
FIGS. 4A and 4B shows exemplary flowcharts for enrolling new users and updating biometric and location data for enrolled users.
Figure 4A:
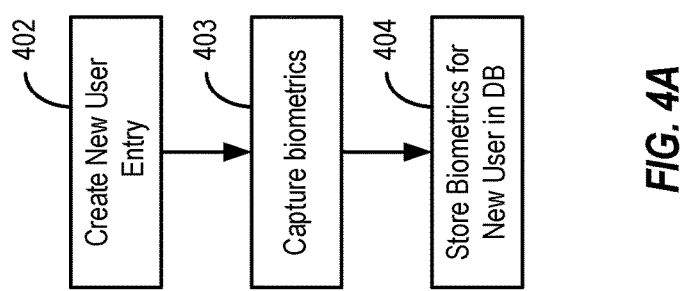

FIG. 4B illustrates an updating operation of the endpoint 101. One or more endpoints 101-105 in FIG. 1 can monitor the movement of users. For example, FIG. 4B shows a flowchart of the steps carried out by endpoint 101 in monitoring users that are captured either by its camera or by its microphone. In step 405, endpoint 101 can collect biometrics by capturing images of faces or voices of users. Biometrics such as images and voices can be captured for biometric template generation in various scenarios. For example, the endpoint 101 can capture biometrics each time a user logs on to his/her desktop computer. In another example, the endpoint 101 can collect biometrics and generate biometric templates every fixed amount of time (say every 10 mins.). In yet another example, the endpoint 101 can include a motion detector coupled to the CPU 123, and the endpoint 101 can be triggered to collect biometrics when it the motion detector detects movement by a user, e.g., a user entering the room in which the endpoint 101 is placed.

In step 406 the endpoint 101 can generate biometric templates using the biometric system 215 (FIG. 1). In step 407, the endpoint 101 can match the generated templates to biometric templates stored in database 221 (e.g., by looking up table 301, FIG. 3A). If no match is found, then the user associated with the biometric template may be a new user. Subsequently, the endpoint 101 can enroll the new user by executing step 404 from FIG. 4A. Alternatively, in cases where the match may not have been found due to low quality of the biometric captured (e.g., low lighting conditions) then the endpoint 101 may decide to do nothing and go back to step 405. Alternatively, the endpoint 101 can improve (e.g., using a light source, zooming, etc.) the biometric capturing conditions and try again. If a match is found, however, then this indicates that the identified user location may need to be updated (step 408). For example, if the user is identified as User A, then the endpoint 101 can update table 303 of FIG. 3C such that the current location field for User A is changed to EP 1. Similarly, the end point 101 can also update table 304 of FIG. 3D such that the dialing information associated with User A includes dialing information of endpoint 101.

In configurations where the processing of biometric data is fully or partially carried out by the MCU 106 (FIG. 2D), the endpoint 101 can merely collect biometrics such as images and voice of the users and send the biometrics to the MCU 106 for biometric template generation, biometric template matching, etc. The MCU 106 can then carry out the enrolment and update procedure on behalf of the endpoints. As discussed previously, the MCU 106 can host the biometric and location database 221, or access the database from server 375 (shown in FIG. 5) storing the database 221.

FIG. 4C shows an exemplary flowchart for making an ad-hoc videoconferencing call to a user. Step 410 provides a user at the endpoint 101 several ways to initiate a call. For example, in one scenario, the user can speak the name of the callee. In another scenario, the user may simply type in the name of the callee via a user interface provided by the endpoint 101. In step 411 the endpoint 101 can determine the identity of the callee. For example, when the caller speaks the name of the callee, the endpoint 101 determines the identity of the callee by converting the voice into text using voice recognition. Voice recognition can be part of the audio processor 223 of the biometric system 215 (FIG. 2C).

Once the identity of the callee is known, the endpoint 101 can access the database 221 to determine the location of the callee (step 412). For example, if the callee is User B, then the endpoint 101 can access the database 221 and look up "User B" to determine his/her current location. For example, the endpoint 101 can look up "User B" in table 303, FIG. 3C, to determine the endpoint where the User B is currently located (EP 5), and then look up the dialing information (step 413) of the endpoint EP 5 from table 302 in FIG. 3B. Endpoint 101 may also lookup table 304 in FIG. 3D for User B to acquire the dialing information directly. Having acquired the dialing information of the endpoint where the callee is located, the endpoint 101 can initiate a videoconferencing call (step 414) using the acquired dialing information. In step 415, endpoint 101 can establish a videoconferencing call with the callee's endpoint, which allows the caller and the callee to carry out a face-to-face conversation.

Figure 5:
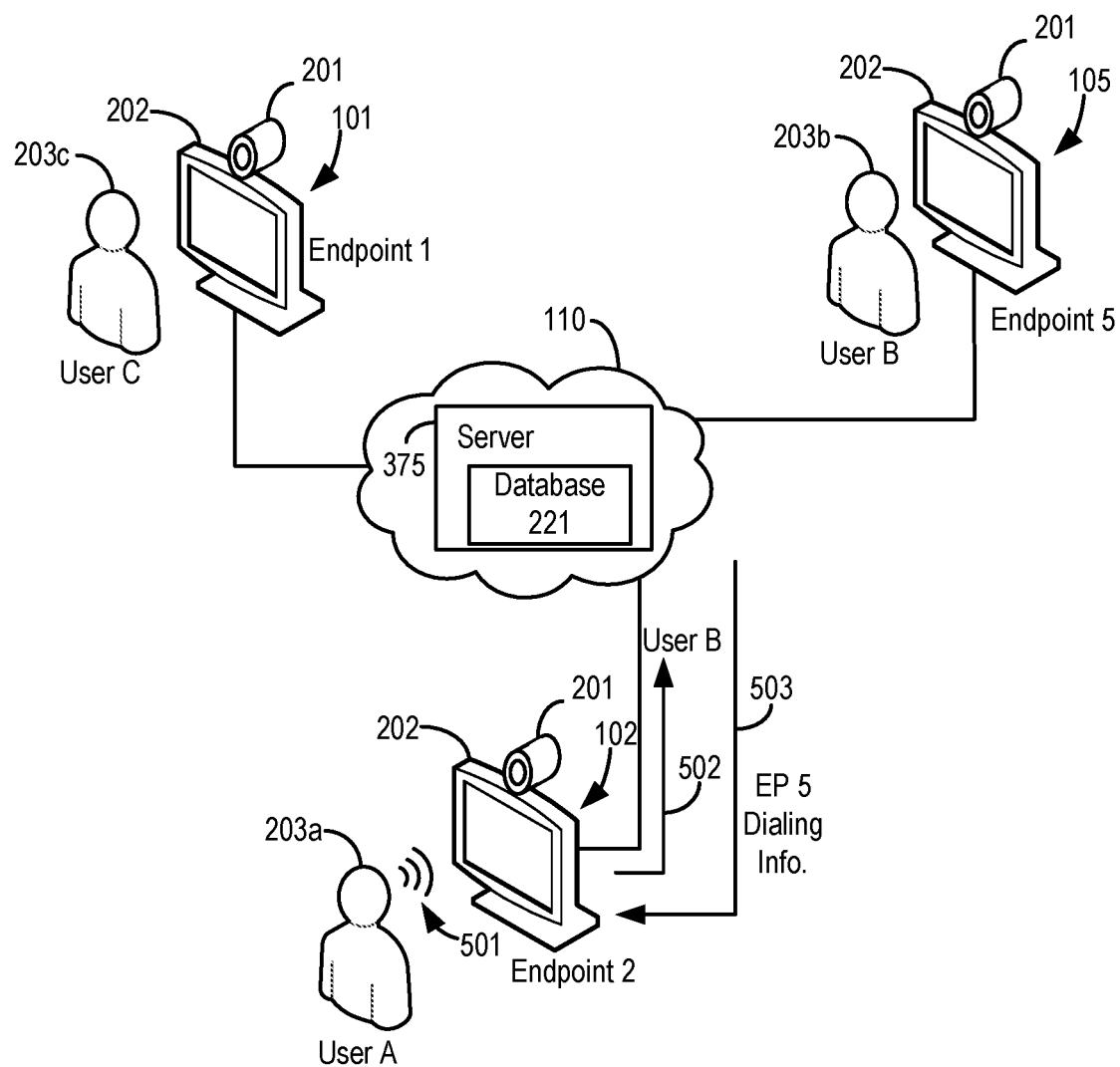
FIG. 5 shows an exemplary scenario depicting some of the steps shown in the flowchart of FIG. 4C.

FIG. 5 shows an example in which User A 203a at endpoint EP 2 102 can initiate a videoconference call with User B 203b. However, in this example, the database 221 can be located at a server 375 anywhere in the network 110. User A 230a need only know the identity of User B 230b, and be able to convey this identity to the endpoint EP2 102. For example, User A 203a can speak the name of User B, the audio 501 of which can be captured by endpoint EP2 102. Endpoint EP2 102 can convert the voice signal of the name of User B 203b spoken by User A 203a into text, and send the text 502 to server 375. Server 375 can access the database 221 (e.g., Tables 301-304 in FIGS. 3A-3D) to determine the current location of User B 203b. In this example, the database 221 can indicate that User B is located at endpoint EP5 105. The server 375 can then return the dialing information of endpoint EP5 105 to endpoint EP2 102, which, in turn, can use the dialing information to initiate a videoconference call with endpoint EP5 105. Similarly, if User A 203a wishes to initiate a videoconference call with User C 203c, User A can speak the name of User C 203c, and the endpoint EP2 102 can query the database 221 at server 375 to determine the location and dialing information of the current endpoint EP1 101 where User C 203c is located.

In the configuration where biometric processing is fully or partially carried out by the MCU 106, initiating a video call to a callee can be carried out in a way that is similar to the one shown in FIG. 5, except that the identity of the callee can be sent to the MCU 106 instead of the server 375.

It should be noted that the endpoint 101 can carry out enrollment and updates even while it is carrying out a request for an unscheduled video call. In other words, steps detailed in FIGS. 3A (enrollment) and 3B (updating) can be carried out even when the endpoint is carrying out steps detailed in FIGS. 3C and 3D. For example, referring to the scenario shown in FIG. 5, when EP 2 102 responds to User A's 203a request for initiating a video call with User B 203b, EP 2 102 can simultaneously carry out the update steps detailed in FIG. 4B to update the current location of User A 203a to be EP 2. Similarly, User A 203a can also be enrolled while the endpoint EP 2 102 is initiating a video call requested by User A 203a if the identity of User A 203a was not previously stored in the database 221.

While the previous discussion showed maintaining a location information that can be repeatedly updated by endpoints, in one example, the location information can be eliminated (e.g., tables 303 and 304 of FIGS. 3C and 3D) and only the biometric and dialing information (e.g., tables 301 and 302 of FIGS. 3A and 3B) can be retained. In such a scenario, the endpoints can perform immediate determination of whether a requested callee is present near them. For example, referring again to the example, of FIG. 5, once endpoint EP 2 102 receives a request, from user A 203a, for a video call to User B 203b, EP 2 102 can send a broadcast search request via its communication interface to each endpoint in the system 100. The search request can include the identity of User B 203b. An endpoint, upon receiving the search request, can collect biometrics for any user that is near the endpoint, and match the collected biometric templates with biometric templates of users stored in database 221 (e.g., table 301 in FIG. 3A). If a match is found, the endpoint where the match is found can reply to the EP 2 102 with a message that the requested callee is present at that endpoint. The reply can also include the dialing information of the replying endpoint. In the example of FIG. 5, both EP 1 and EP 5 105 can collect biometric data of User C 203c and User B 203b, respectively, upon receiving the search request from EP 2. Upon performing biometric template matching, EP 5 105 can reply to EP 2 102 with a message indicating that the requested callee User B 203b is located at EP 5 105 along with dialing information of EP 5 105. EP 2 102 can subsequently initiate and establish a videoconference call between User A 203a and User B 203b using the received dialing information. In this scenario, it may be beneficial (but not required) in terms of performance to have biometric templates of all enrolled users (e.g., Table 301 in FIG. 3A) be locally present at each endpoint for faster access.

Thus, users can initiate an unscheduled videoconferencing call with other users merely by knowing their names. The endpoint 101 provides users to communicate with each other in a manner that is not unlike starting a face-to-face conversation. A user can approach an endpoint and speak the name of the callee, and a few moments later an image of the callee appears on the display screen. The user need not remember and enter long IP addresses or dialing information of the callee.

Figure 6:
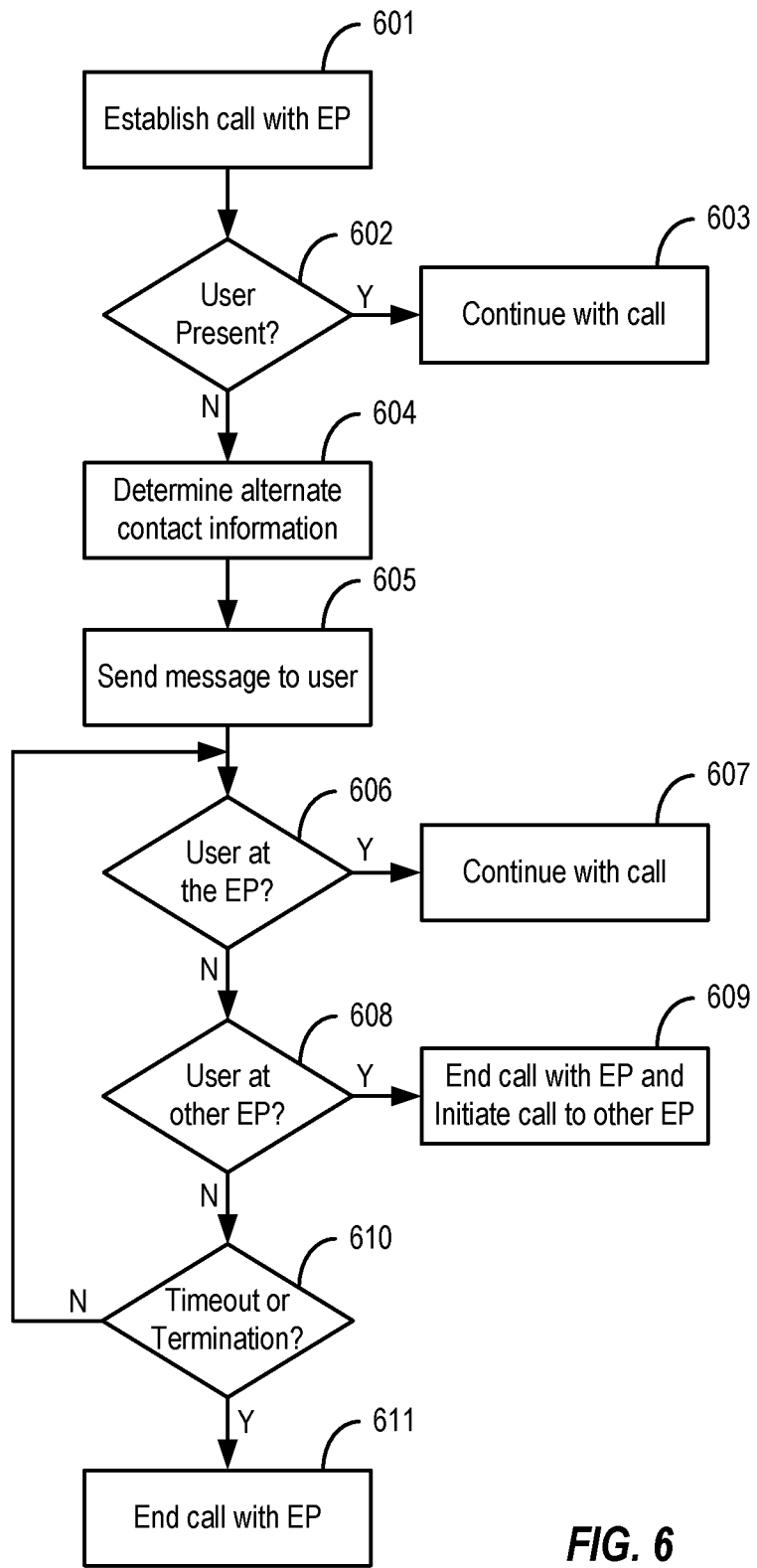
FIG. 6 shows an exemplary flowchart for steps taken by the endpoint if the callee is not present at the called endpoint.

In some cases, it may be possible that while the location database 221 indicates that a user is located at a particular endpoint, the user may not be present at the endpoint when another user initiates a videoconferencing call. This can occur, for example, when the user moves away from an endpoint before an update is performed by the endpoint. In one example, the endpoint 101 can detect whether the called user is present at the called endpoint, and if not, take additional actions to either notify the called user of the received call or determine a new location of the called user. FIG. 6 shows a flowchart in which the endpoint 101 can establish an ad-hoc call (step 601) with another endpoint. For example, step 601 can be similar to step 415 shown in FIG. 4C, in which step the endpoint 101 can establish a videoconference call with the endpoint at which the callee is located. In step 602, the endpoint 101 can determine whether the callee is actually present at the called endpoint. This determination can be made in several ways. In one example, the caller may indicate to the endpoint 101 that it does not see the callee in the video stream received from the called endpoint. In another example, the called endpoint can carry out face recognition to determine if the callee is present in the captured video. In yet another example, the endpoint 101 can access the location database 221 to check whether the location of the callee has changed between the time the database was last examined and the time when the call was established. If the callee is present at the called endpoint, then endpoint 101 can continue with the call in step 603. However, if the callee is not present at the called endpoint, then in step 604 endpoint 101 can determine alternate contact information for the callee.

FIG. 7 shows table 701 that includes alternate contact information of users. Table 701 is similar table 303 of FIG. 3C in that table 701 also includes columns for User Identity (702), Current Location (703), and Last-Known Location (704). But table 701 also includes additional columns corresponding to alternate contact information of the users. For example, column 705 can include mobile phone numbers of the users and column 706 can include e-mail addresses of the users. Although not shown, table 701 can also include additional contact information, such as pager number, internet chat ID, etc. In another example, table 701 can also include public announcement contact information such as a messaging board, an audio-visual public announcement system within the company, etc. In other words, any information that can allow the endpoint 101 to contact the callee can be listed in table 701. Table 701 can be stored in the database 221 and can be accessed by any endpoint in network 100.

Returning to the flowchart of FIG. 6, after determining alternate contact information of the callee in step 604, endpoint 101 can send a message (step 605) to the callee, which message can include notification that a video call is waiting for the callee at the called endpoint. The message can include the name and location of the caller, the name, location, and dialing information of the called endpoint, etc. The message can allow the callee to return to the endpoint he/she was last located or go to another endpoint (e.g., the closest) to continue with the video call.

The callee may choose to return to the called endpoint. In this case the videoconference call can continue between the endpoint 101 and the called endpoint (in step 607). The callee may also choose to go to an endpoint other than the called endpoint. For example, the callee may receive the notification message in the form of a text message on his/her mobile phone or handheld portable device (e.g., IPHONE®, IPAD®, etc.). If the mobile phone or the handheld device have video conferencing capability, and the callee chooses to use it for the videoconferencing call, the callee can log-in on the mobile phone or turn it on so that his/her image can be captured. The mobil device can then update the location database 221 with the current location of the callee (e.g., using update method described in FIG. 4B).

In step 608, the endpoint 101 can access the location database 221 to determine whether any updates on the location of the callee have taken place. If callee location has been updated to another endpoint, then the endpoint 101 can acquire the dialing information of that endpoint and initiate a videoconference call (step 609). In this case the endpoint can end the previous call to the endpoint where the callee was not found to be located. If however, the callee location is not updated, and the callee does not return to the originally called endpoint, then the endpoint 101 can wait for a termination notification from the caller or use a timer (which can be user definable e.g., 3-5 minutes) to time out and disconnect the call (in step 611).

The steps of FIG. 6 can also be carried out by the control module 254 of the MCU 106 (FIG. 2D) on behalf of the endpoint 101. In such a scenario, the control module 254 can establish a video call with the called endpoint and determine whether the callee is present at that endpoint. If the callee is not present, then the control module 254 can carry out determining alternate contact location, sending message to the callee, and determining if the callee is relocated at another endpoint location. Endpoint 101, where the caller is located, can be put on hold during the duration the control module 254 is determining the new location of the callee. If the callee is determined to be located at another endpoint (e.g., in step 608 of FIG. 6), then the endpoint 101 can be take off from a hold state and be connected to the another endpoint. If the callee's location cannot be determined, then the control module 254 can send a message to the endpoint 101 indicating so and terminate the call after a timeout period.

While the above discussion focused on the caller making an unscheduled call to a single callee, a person skilled in the art can appreciate that the endpoint 101 can allow the caller to make unscheduled calls to multiple callees using the MCU 106.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method comprising:
   storing a first biometric data set corresponding to a first user identity;
   storing a second biometric data set corresponding to a second user identity;
   receiving a request at a multipoint control unit (MCU) from a first conferencing endpoint to place an unscheduled call directed to the first user identity;
   capturing a third biometric data set at a second conferencing endpoint after receipt of the request at the MCU;
   receiving the third biometric data set from the second conferencing endpoint by the MCU;
   performing, by the MCU, a comparison between the third biometric data set and the first biometric data set; and
   connecting, by the MCU, a call between the second conferencing endpoint and the first conferencing endpoint based, at least in part, on the comparison between the third biometric data set and the first biometric data set by the MCU indicating the presence of the first user at the second conferencing endpoint location.

2. The method of claim 1, further comprising:
   capturing a fourth biometric data set at a third conferencing endpoint after receipt of the request at the MCU;
   receiving the fourth biometric data set from the third conferencing endpoint by the MCU;
   performing a comparison between the fourth biometric data set and the first biometric data set; and
   connecting, by the MCU, a call between the third conferencing endpoint and the first conferencing endpoint based, at least in part, on the comparison between the fourth biometric data set and the first biometric data set by the MCU indicating the presence of the first user at the second conferencing endpoint location.

3. The method of claim 1, wherein storing the first biometric data set and the second biometric data set comprises storing the first biometric data set and the second biometric data set at one or more servers.

4. The method of claim 1, wherein storing the first biometric data set and storing the second biometric data set comprises storing the first and second biometric data sets at the MCU.

5. The method of claim 1, wherein performing the comparison between the third biometric data set and the first biometric data set comprises using one or more of kernel class-dependent feature analysis, tensor facial recognition, linear discriminant analysis, Bayesian intrapersonal-extrapersonal classification, and Gabor filter graph matching.

6. The method of claim 1, wherein performing the comparison between the third biometric data set and the first biometric data set comprises using one or more of a hidden Markov model and a Gaussian mixture model.

7. The method of claim 1, wherein capturing the third biometric data set at the first conferencing endpoint comprises at least one of capturing facial information using a video sensor and capturing voice information using an audio sensor.

8. The method of claim 1, wherein at least one of the first conferencing endpoint and the second conferencing endpoint is a video conferencing endpoint.

9. The method of claim 1, wherein receiving a request at the first conferencing endpoint to place the call directed to the first user identity comprises receiving a request at the first conferencing endpoint to place a video call directed to the first user identity.

10. One or more non-transitory computer readable media storing instructions executable by one or more processors of a multipoint control unit (MCU), wherein the instructions comprise instructions to:
store a first biometric data set corresponding to a first user identity;
store a second biometric data set corresponding to a second user identity;
receive a request from a first conferencing endpoint to place an unscheduled call directed to the first user identity;
receive a third biometric data set from a second conferencing endpoint, the third biometric data captured after receipt of the request;
perform a comparison between the third biometric data set and the first biometric data set; and
connect a call between the first conferencing endpoint and the second conferencing endpoint based, at least in part, on the comparison between the third biometric data set and the first biometric data set indicating the presence of the first user at the second conferencing endpoint location.

11. The one or more non-transitory computer readable media of claim 10, wherein the instructions further comprise instructions to:
receive a fourth biometric data set from a third conferencing endpoint, the fourth biometric data captured after receipt of the request;
perform a comparison between the fourth biometric data set and the first biometric data set; and
connect a call between the first conferencing endpoint and the third conferencing endpoint based, at least in part, on the comparison between the fourth biometric data set and the first biometric data set indicating the presence of the first user at the third conferencing endpoint location.

12. The one or more non-transitory computer readable media of claim 10, wherein the instructions to store the first biometric data set and the second biometric data set comprise instructions to store the first biometric data set and the second biometric data set at one or more servers.

13. The one or more non-transitory computer readable media of claim 10, wherein the instructions to store the first biometric data set and the instructions to store the second biometric data set comprise instructions to store the first and second biometric data sets at the MCU.

14. The one or more non-transitory computer readable media of claim 10, wherein the instructions to perform the comparison between the third biometric data set and the first biometric data set comprise instructions to perform one or more of kernel class-dependent feature analysis, tensor facial recognition, linear discriminant analysis, Bayesian intrapersonal-extrapersonal classification, and Gabor filter graph matching.

15. The one or more non-transitory computer readable media of claim 10, wherein the instructions to perform the comparison between the third biometric data set and the first biometric data set comprise instructions to utilize one or more of a hidden Markov model and a Gaussian mixture model.

16. The one or more non-transitory computer readable media of claim 10, wherein the third biometric data set includes facial information captured using a video sensor or voice information captured using an audio sensor, or to both facial information captured using a video sensor and voice information captured using an audio sensor.

17. A multipoint control unit (MCU) comprising one or more processing units, wherein the one of more processing units are configured to:
store a first biometric data set corresponding to a first user identity;
store a second biometric data set corresponding to a second user identity;
receive a request from a first conferencing endpoint to place an unscheduled call directed to the first user identity;
receive a third biometric data set from a second conferencing endpoint, the third biometric data captured after receipt of the request;
perform a comparison between the third biometric data set and the first biometric data set; and
connect a call between the first conferencing endpoint and the second conferencing endpoint based, at least in part, on the comparison between the third biometric data set and the first biometric data set indicating the presence of the first user at the second conferencing endpoint location.

18. The MCU of claim 17, wherein the one or more processing units are further configured to:
receive a fourth biometric data set from a third conferencing endpoint, the fourth biometric data captured after receipt of the request;
perform a comparison between the fourth biometric data set and the first biometric data set; and
connect a call between the first conferencing endpoint and the third conferencing endpoint based, at least in part, on the comparison between the fourth biometric data set and the first biometric data set indicating the presence of the first user at the third conferencing endpoint location.

19. The MCU of claim 17, wherein the one or more processing units are further configured to store the first biometric data set and the second biometric data set at one or more servers.

* * * * *